US006670580B2

(12) United States Patent
Brofft et al.

(10) Patent No.: US 6,670,580 B2
(45) Date of Patent: *Dec. 30, 2003

(54) POWER BOX

(75) Inventors: Roger W. Brofft, Loveland, OH (US); Roger Lee Rieckers, Georgetown, IN (US); David L. Remerowski, Cincinnati, OH (US); Robert J. Schmidt, Cincinnati, OH (US); William Roland Cooper, Clarksville, IN (US)

(73) Assignee: Senco Products, Inc., Cincinnati, OH (US)

( * ) Notice: Subject to any disclaimer, the term of this patent is extended or adjusted under 35 U.S.C. 154(b) by 20 days.

This patent is subject to a terminal disclaimer.

(21) Appl. No.: 09/849,753

(22) Filed: May 4, 2001

(65) Prior Publication Data

US 2002/0163196 A1 Nov. 7, 2002

(51) Int. Cl.⁷ ................................................ B23K 9/10
(52) U.S. Cl. ...................................... 219/134; 290/1 R
(58) Field of Search ................................ 219/133, 134; 290/1 A, 1 R; 137/899.4

(56) References Cited

U.S. PATENT DOCUMENTS

| 1,947,713 A | | 2/1934 | Gumpper | |
| 2,364,013 A | | 11/1944 | Waseige | 290/1 |
| 2,789,756 A | * | 4/1957 | Allen | 137/899.4 |
| 3,035,757 A | | 5/1962 | Poore et al. | |
| 3,514,219 A | | 5/1970 | Mitchell et al. | 417/364 |

(List continued on next page.)

FOREIGN PATENT DOCUMENTS

| WO | WO 01/43272 | 8/2000 | |
| WO | WO01/12967 | 2/2001 | F02B/63/04 |

OTHER PUBLICATIONS

Trak Honda & MegaJet, *MegaJet 4 in 1 Workstation*, http://wwww.megajet.com.au/indiex.html; 1997–2000.

(List continued on next page.)

*Primary Examiner*—M. Alexandra Elve
*Assistant Examiner*—Kevin McHenry
(74) *Attorney, Agent, or Firm*—Wood, Herron & Evans, L.L.P.

(57) ABSTRACT

An integrated generator, compressor and welding power supply sized to fit within a pickup bed. The lower portion of the housing is sized to fit between the wheel wells of a pickup truck bed, while an upper housing portion is sized to extend over at least one bed wall. The position of the upper housing portions may be changed either vertically or horizontally to accommodate different makes or models of trucks. The lower housing portion includes feet extending downwardly therefrom, to suspend a bottom side of the lower housing above the floor of the truck bed, and thereby permit access to the bed floor beneath the unit. The lower portion contains an internal combustion engine for generating mechanical power, an alternator, and electrically driven compressors. Ducting and baffles facilitate air flow and cooling in this portion. A fuel tank and a control panel are positioned in the upper housing portions. Engine controls, connections for one-and three phase electrical power, air connections and pressure regulators, and an air storage tank purge valve, are all available on the outside of the unit at the control panel, for ready access.

23 Claims, 5 Drawing Sheets

U.S. PATENT DOCUMENTS

| | | | | |
|---|---|---|---|---|
| 3,770,976 | A | * 11/1973 | Stroud et al. | 219/133 |
| 4,173,951 | A | 11/1979 | Ishihara | 123/2 |
| 4,293,281 | A | * 10/1981 | Lamoreaux | 417/9 |
| 4,930,550 | A | * 6/1990 | Czerwinski et al. | 137/334 |
| 5,087,824 | A | 2/1992 | Nelson | 290/1 A |
| 5,125,236 | A | 6/1992 | Clancey et al. | 62/115 |
| 5,203,857 | A | * 4/1993 | Terwilliger et al. | 417/552 |
| 5,341,644 | A | * 8/1994 | Nelson | 60/627 |
| 5,518,032 | A | * 5/1996 | Berke | 137/559 |
| 5,599,470 | A | * 2/1997 | Peotter et al. | 219/133 |
| 5,899,174 | A | 5/1999 | Anderson et al. | |
| 6,051,809 | A | * 4/2000 | Colella | 219/133 |
| 6,065,942 | A | * 5/2000 | Glidden et al. | 417/236 |
| 6,085,770 | A | * 7/2000 | MacNeal et al. | 137/15.04 |
| 6,099,265 | A | 8/2000 | Rowe et al. | |
| 6,102,672 | A | 8/2000 | Woollenweber et al. | |
| 6,103,995 | A | 8/2000 | Bankstahl | |
| 6,296,027 | B1 | * 10/2001 | Bender et al. | 141/18 |
| 6,362,533 | B1 | 3/2002 | Morohoshi et al. | |
| 6,489,591 | B1 | 12/2002 | Achtner | |
| 2002/0122727 | A1 | * 9/2002 | Gaither | 417/16 |

OTHER PUBLICATIONS

High Technology Welding Equipment, *The best of Esseti Technology to challenge year 2000 and beyond.*, Product Brochure, 2000.

Multiquip, Inc., *Construction & Power Generation: 1999 Equipment Guide*, Product Brochure, 1999.

The Lincoln Electric Company, *Welding The World Together*, Equipment Products Catalog, 9/99.

Miller Electric Mfg. co., *Full–Line Catalog 2000*, Products Brochure, 2000.

Thermal Arc Inc., A Thermadyne Company, *Power–Plus Series, Predator*, Product Brochure, 1999.

Thermadyne Indus tries, Inc., *Take A Look At What's New*, Product Brochure, Spring/Summer 2000.

Thermal Arc, Inc., A Thermadyne Company, *WHY is everyone asking if you've Got Power?*, Product Brochure, 2000.

Thermadyne, *Innovative Solutions For All Your Cutting and Welding Needs.*, Products Brochure, 7/99.

Thermal Arc, Inc., A Thermadyne Company, *2000 Welding Products Catalog*, Products Catalog, 2000.

Trinkner et al., *Fuel Tank Filler Assembly for Engine Driven Welder*, US2001/0000607; Published May 3, 2001.

http://www.millerwelds.com/professional/products/engine driven/M10200/ and features/, *Miller. The Power of Blue. Products and Features. Miller Air Pak*, Miller Electric Website, Oct. 2001.

* cited by examiner

POWER BOX

FIELD OF THE INVENTION

The present invention relates to power generating units such as compressors, electrical generators and welding power supplies, and particularly units of this type that can be transported to a work site.

BACKGROUND OF THE INVENTION

Portable units that can be carried to a site are known, and a typical unit of this type, such as a TS 200, Model 5000 welder/generator sold by Burco/Mosa, includes an open, lightweight frame consisting of metal tubing on which is mounted an internal combustion engine directly connected to an alternator, which generates sufficient amperage to operate direct current welders and to provide some auxiliary alternating current for operating auxiliary equipment, such as a compressor that may be used to providing the compressed air needed to operate a plasma cutting torch used in conjunction with the welding equipment.

While units of this type operate satisfactorily, they have several disadvantages. First, and most importantly, even though the welder/generator or compressor are portable, it is nevertheless difficult and time consuming to load and unload, then connect up the various components which are included in the system. More specifically, in a typical operation, the portable welder/generator, which may weigh approximately 200 pounds, is lifted onto the bed of a pickup truck. Because it is so heavy, it is usually placed at the rear of the bed to avoid unnecessary lifting, and because it is so big, it creates an obstacle that makes it difficult to place any significant equipment in the pickup truck. Next, the compressor, which is a separate unit and also heavy (e.g. 150 pounds), must be lifted and placed on the bed of the pickup truck. At the job site, these units are generally unloaded from the truck, and in any event, they must be connected to one another, and with the welding and plasma cutting equipment, all of which is time consuming and often requires additional lifting of heavy equipment.

Moreover, even though the individual components of the system are relatively heavy, they nevertheless can be stolen and carried away from the back of a pickup truck, and therefore it is the general practice of those who use such equipment to unload and properly store the equipment in a secure location at the end of each working day, and again, this results is a significant amount of lifting of heavy equipment. The same is true for smaller, auxiliary tools that are used with these units, such as plasma cutters, mig welders and/or welding leads, all of which must also be removed from the truck and stored.

Finally, in such known units, the tubular frame in which the internal combustion engine and the alternator are carried is entirely open, and, as a result, workmen and others located near the equipment are constantly exposed to very high levels of noise resulting from the operation of the engine, the alternator, and the associated compressor unit.

Colella, U.S. Pat. No. 6,051,809, describes a welder/generator and compressor unit that is sized to fit in the bed of a pickup truck. Specifically, the unit has a generally T-shaped cross section, with a lower housing portion sized to fit between the bed walls of a standard pickup truck bed. The upper portion of the housing is somewhat wider, extending over and resting on the bed walls, thus forming the T-shape. On one end of the upper portion of the housing are controls for and connection to the welder generator and compressor. Within the housing are various components including an internal combustion engine, alternator, and air compressor, as well as an accumulator tank for storing compressed air produced by the compressor, a battery, electrical and compressed air connections, and a storage area. The engine, alternator and compressor are mounted in longitudinal alignment, with the drive shaft of the engine directly mechanically driving the shaft of the alternator and also mechanically driving the shaft of the air compressor through a speed-reducing pulley arrangement.

The Colella device has the advantage of being easily transportable in the bed of pickup truck, and having conveniently located controls and connections to permit use of all of the units without removal from the pickup truck. Furthermore, the enclosed housing provided in the Colella device allows for some reduction of noise.

Unfortunately, the device shown in the Colella patent has a number of drawbacks. First, there is no provision in the described device for storage of fuel for the engine. Presumably, a fuel tank would be provided within an unused portion of the housing or in the truck bed adjacent to the unit. In such a position, the tank would be difficult to access for refueling. Furthermore, in typical use, the Colella device would remain within the pickup truck bed at all times, therefore, when the fuel tank (wherever positioned) is refilled, spilled fuel would fall into the housing or truck bed soiling the bed or housing and creating a potential safety hazard. Similarly, the Colella patent does not describe a purge valve for the accumulator tank which would be needed to purge condensed water from the tank. Typically, such a valve is located on the tank. However, such a location would be inconvenient. Also, when a purge valve on the compressed air accumulator tank is opened to purge water from the tank, water is likely to be emitted into the housing, introducing unwanted moisture into the housing.

Second difficulty with the Colella design is that it is sized to fill the entire width of a pickup truck bed. As a consequence, the unit can only be readily installed adjacent the tailgate of the truck bed, to the rear of the wheel wells, for the reason that the width of the unit prevents sliding the unit past the wheel wells. Although, the unit may be lifted over the wheel wells to a forward position in a short bed truck, the unit may be required to be placed in a rearward position for the reason that a short bed truck permits insufficient space (only about one foot) for the Colella unit to fit between the wheel wells and forward end of the truck bed. Positioned in a rearward bed location, the unit limits other uses of the truck bed, as items must be lifted over the bed walls to be placed in the bed, rather than sliding those items into the bed via the tail gate. Furthermore, with the Colella unit in the truck bed, the length of the bed is shortened such that the bed may no longer accommodate typical construction materials such a plywood sheets.

A third difficulty with the Colella design arises when fitting the unit to pickup trucks of different makes and models. While there is, to a reasonable extent, a standard pickup bed width, there is no standard height for pickup bed walls. As a result, the intended fit of the Colella unit, to rest on the pickup walls, will likely be correct for only a certain class of pickups. When the unit is installed in other classes of pickups, it is likely to either rest on the floor of the truck bed with the upper housing sections inconveniently elevated above the top of the bed walls, or, alternatively, rest on the top of the bed walls but with a substantial gap between the bottom of the housing and the bed floor. In the former case, the housing floor would need to be designed to distribute weight, to prevent damage to either the unit or truck bed when the unit is resting on its bottom surface. The only way to avoid such issues would be to reduce the height of the lower housing of the unit to a height less than the shortest bed wall in which the unit might be used, which would reduce the volume of the housing available for the identified components.

In addition to the foregoing difficulties, there is the further complication that the total weight of the various elements called for the Colella patent can easily approach 800 pounds, exceeding the weight that can be supported by typical truck bed rails, and requiring substantial reinforcement of the upper housing portions to support the unit in the intended manner.

A further difficulty with the Colella unit arises from the manner in which elements are positioned within the housing. The longitudinal, mechanically coupled arrangement of the engine, alternator and compressor makes efficient use of the space; however, it hinders the efficient flow of cooling air to those elements since such units are typically designed to obtain or exhaust cooling air in the longitudinal direction, and each element is longitudinally abutting either another element or the housing and truck bed walls. As a consequence, cooling air flow may be restricted and/or heated air may be caused to flow from one unit onto another, limiting cooling.

Finally, the Colella unit, while portable, may have limitations in some environments where a pickup truck cannot be positioned close to the work area —for example, where welding is being performed deep within a structure, it may be inconvenient, or detrimental to weld power, to run long electrical leads carrying welder voltages and currents from an externally-parked pickup truck to the work site.

SUMMARY OF THE INVENTION

The present invention is directed to an integrated generator, compressor and welding power supply sized to fit within a pickup bed that improves upon the Colella unit by ameliorating the difficulties with the Colella unit that have been described above, and also enhancing features of the Colella device.

Specifically, in a first aspect, the invention features an integrated electrical and/or mechanical power generating unit, having a lower housing portion sized for placement within a pickup truck bed and an upper housing portion sized to extend over at least one bed wall. The housing contains an internal combustion engine for generating the electrical and/or mechanical power, and a fuel tank which is positioned in the upper housing portion. The fuel tank includes a filler orifice extending out of the upper housing portion such that fuel spilled when filling the tank has a flow path on the outside of the upper housing and an outside of the bed wall. This position of the fuel tank thus ameliorates spillage of fuel into the housing or bed as a consequence of refueling the tank.

In a second aspect, the invention features a portable compressed air generating unit, such as part of an integrated generator, compressor, and welding power supply, having a compressor and accumulator tank for storing compressed air, in which the accumulator tank has a purge orifice and a hose connected thereto leading to a remote manual purge valve and outlet. The manual purge valve may be conveniently located with the controls for the unit, and the outlet positioned in any convenient location outside the housing.

In a third aspect, the invention features an integrated electrical and/or mechanical power generating unit having a lower housing portion sized to fit between the wheel wells of a pickup truck bed and an upper housing portion sized to extend over at least one bed wall. Because the lower portion fits between the wheel wells, the unit may be readily slidingly positioned at any location in the bed, including a fully forward position, facilitating access to the remainder of the bed via the tail gate, or even a position directly between the wheels.

In a related aspect, the invention features an integrated electrical and/or mechanical power generating unit having a lower housing portion sized to fit within a pickup truck bed, and an upper housing portion sized to extend over at least one bed wall where the upper housing portion is adjustably mounted to the lower housing portion, so that the position of the upper housing portion may be changed either vertically or horizontally accommodate different makes or models of trucks, thus ameliorating difficulties raised by non-standardized sizing of truck bed walls.

In further related aspect, the invention features an integrated electrical and/or mechanical power generating unit having a lower housing portion sized to fit within a pickup truck bed, and an upper housing portion sized to extend over at least one bed wall, where the lower housing portion includes feet extending downwardly therefrom, to suspend a bottom side of the lower housing above the floor of the truck bed, and thereby permit access to the bed floor beneath the power generating unit for, e.g., a storage drawer or hauling elongated cargo such as plywood sheets.

In a further aspect, the invention features an integrated generator and compressor unit having a housing sized for placement within the bed of a pickup truck. Within the housing is an electrical power generating unit and an electrically powered compressor driven by electric power from the generating unit. By utilizing an electrically driven compressor, difficulties in mechanically coupling the generator drive to a compressor are ameliorated.

An additional aspect relates to improving the cooling of an integrated electrical and/or mechanical power generating unit, having a housing sized to fit within a pickup track bed. The unit comprises an air-cooled internal combustion engine having internal air flow passages, and an air cooled electrical or mechanical power converting unit (such as a generator or compressor) coupled to receive power generated by the engine and having internal air passages. The housing incorporates ducting to deliver cooling air to or from the internal air flow passages of the engine from or to an area outside of the housing, and further includes additional ducting to deliver cooling air to or from the internal air flow passages of the power converting unit from or to an area outside of the housing. In the specific embodiment, both an alternator and compressor are included and each is provided with such ducting.

Further aspects relate to improving the usability of an integrated electrical power generating unit through provision of connections. Here again, the power generating unit has a housing sized to fit within a pickup truck bed. In the first such aspect, the unit includes an internal generator generating three-phase alternating current electrical power, coupled to a three-phase connector external to the housing. Such a connection facilitates the work of crews such as elevator installers who primarily use tools needing three-phase power. In a related aspect, the integrated unit includes three-phase connectors for a welding power supply. The unit's housing includes a closet space for receiving the welding power supply so that the welding power supply can be used when "docked" inside the housing, or positioned remotely. This feature permits the welding power supply and its associated controls to be moved from location of the rest of the unit to a remote position more convenient to the work site.

The invention also features an integrated electrically and compressed air generating unit sized to fit within the bed of a pickup truck, in which the unit control panel includes electric power connections, compressed air connections, and pressure regulators for controlling generated compressed air. By including a pressure regulator in the control panel the need for external pressure regulation is ameliorated.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

BRIEF DESCRIPTION OF THE DRAWINGS

Figure 1:
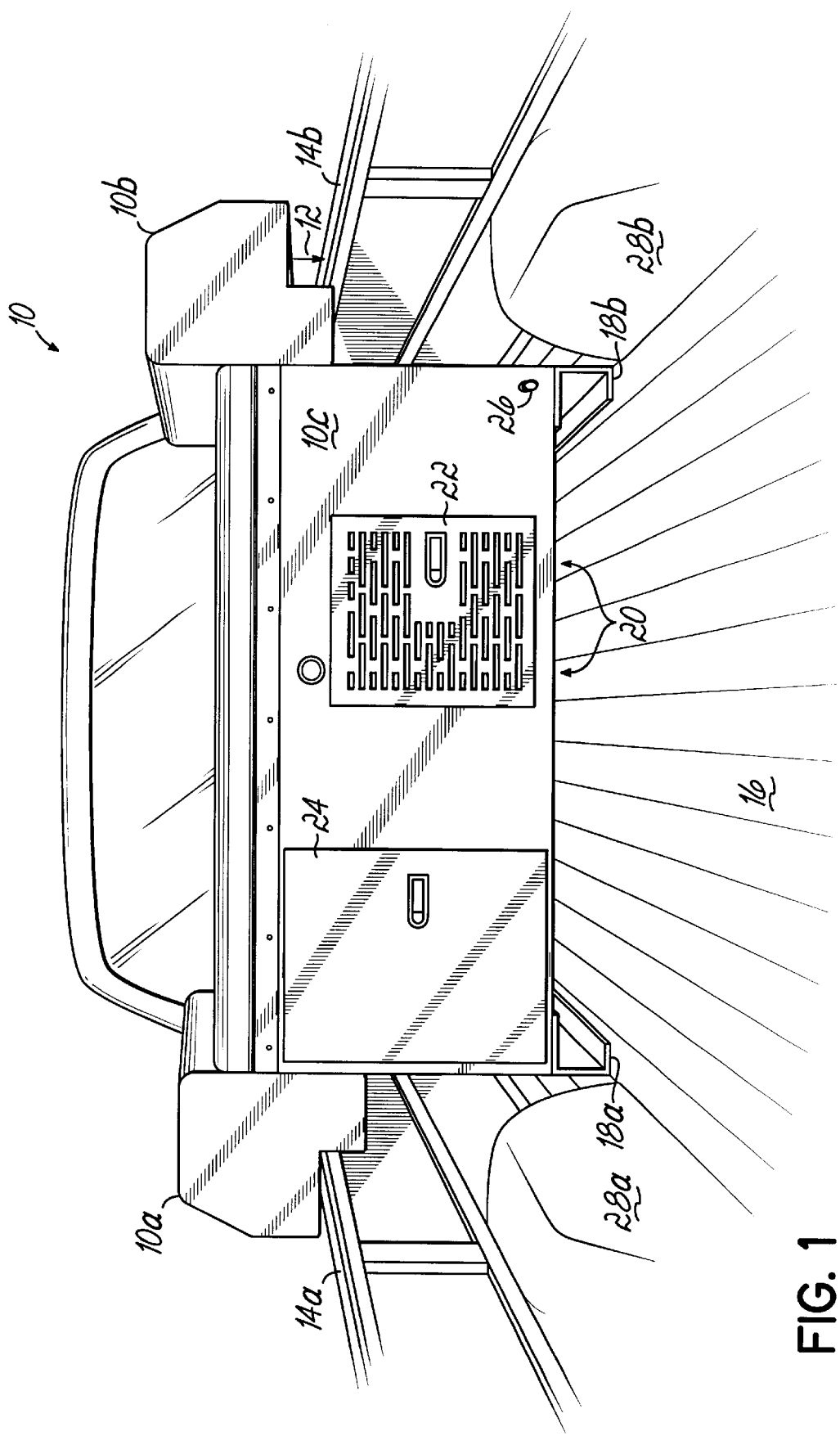

FIG. 1 is a partial perspective view of the rear of an integrated power unit in accordance with the principles of the present invention.

Figure 2:
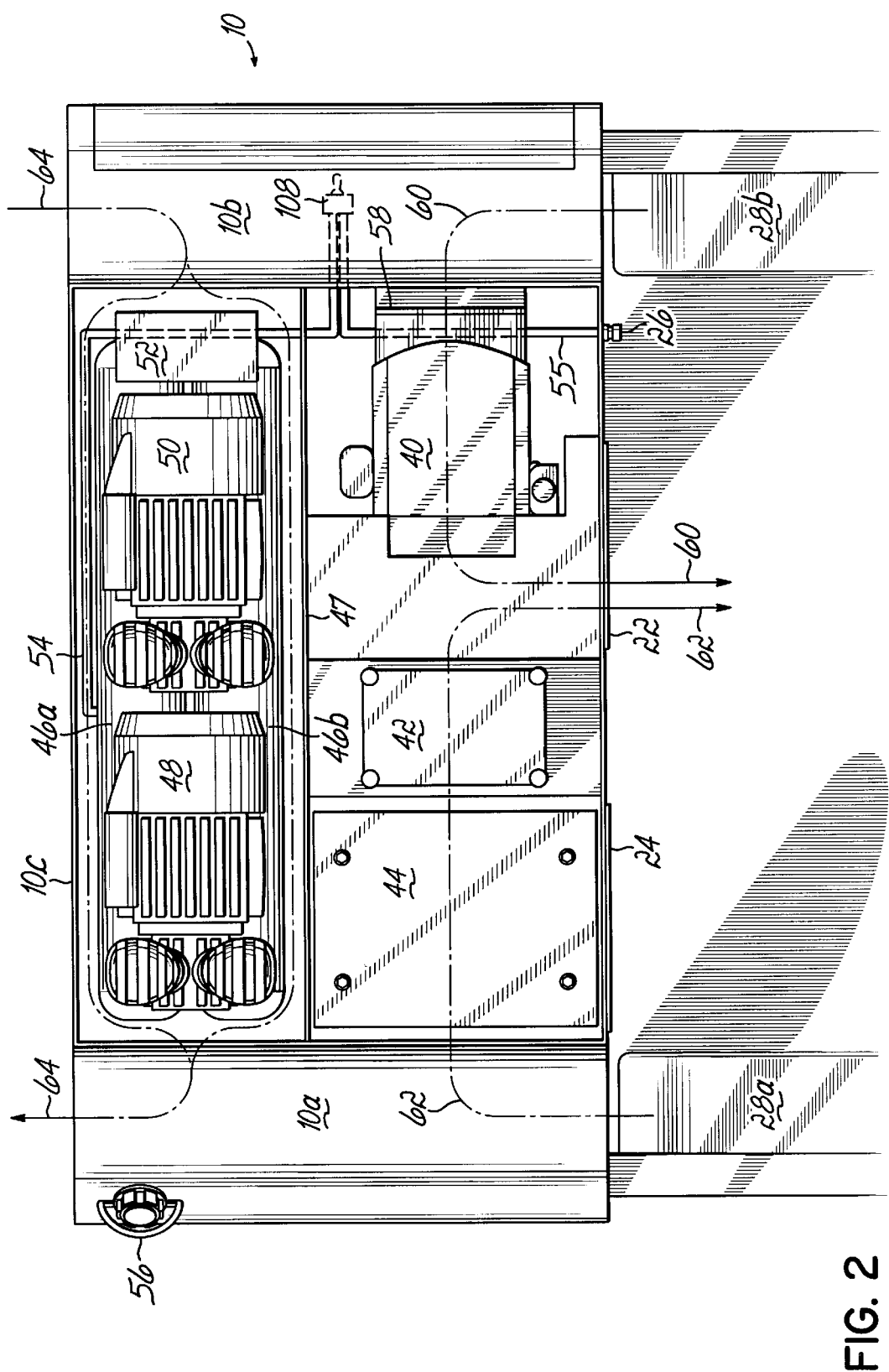

FIG. 2 is a top elevation view of the integrated power unit of FIG. 1.

Figure 3:
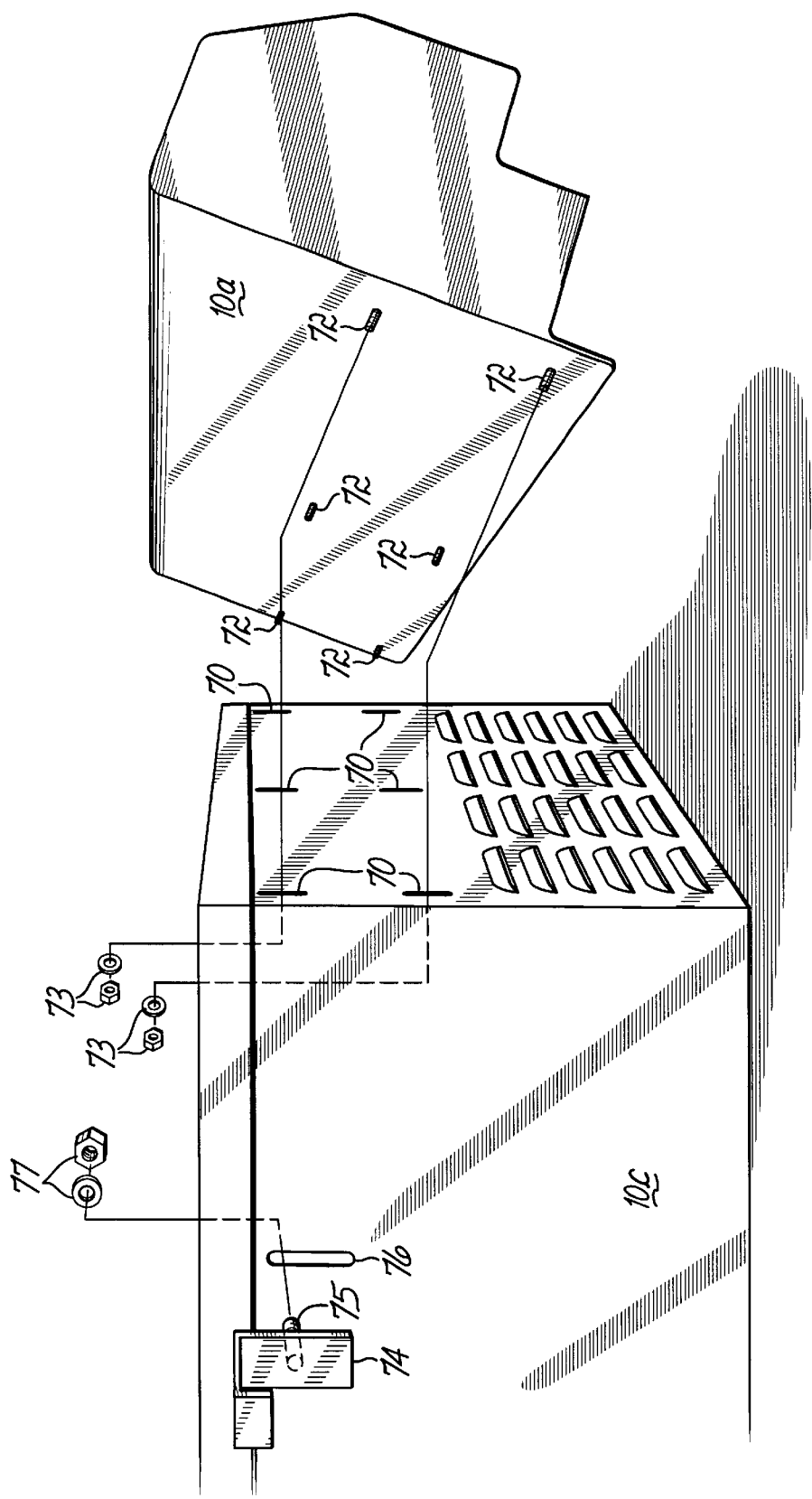

FIG. 3 is a perspective rear view of a bolster disassembled from the integrated power unit of FIG. 1.

Figure 4:
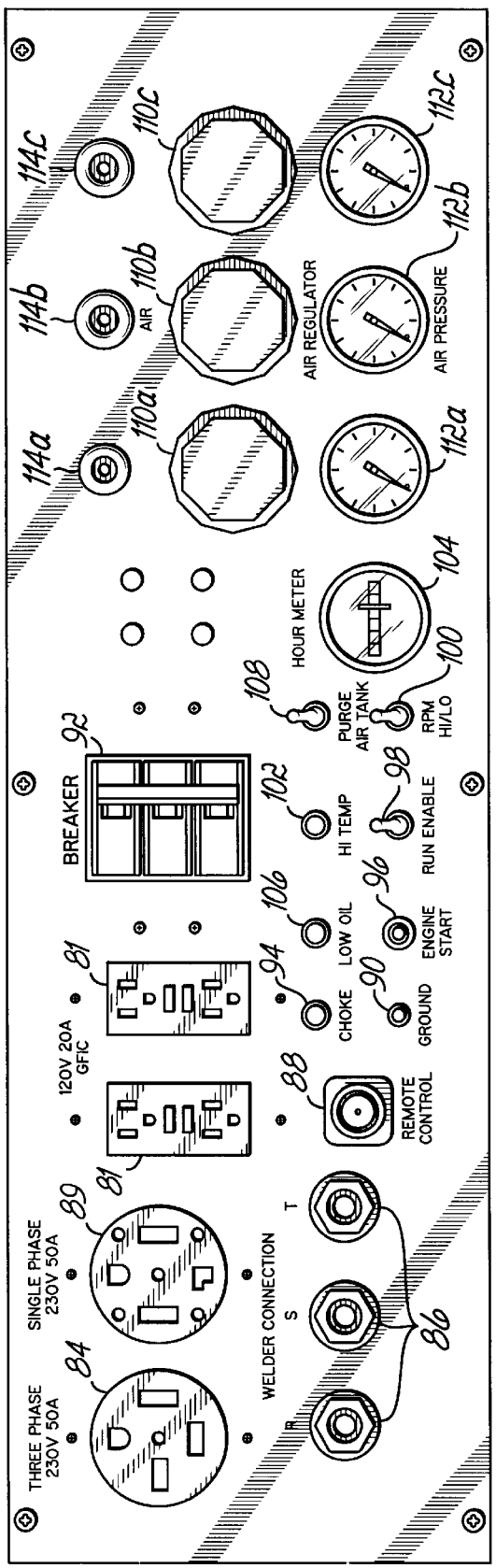

FIG. 4 illustrates a control panel of the integrated power unit of FIG. 1.

Figure 5:
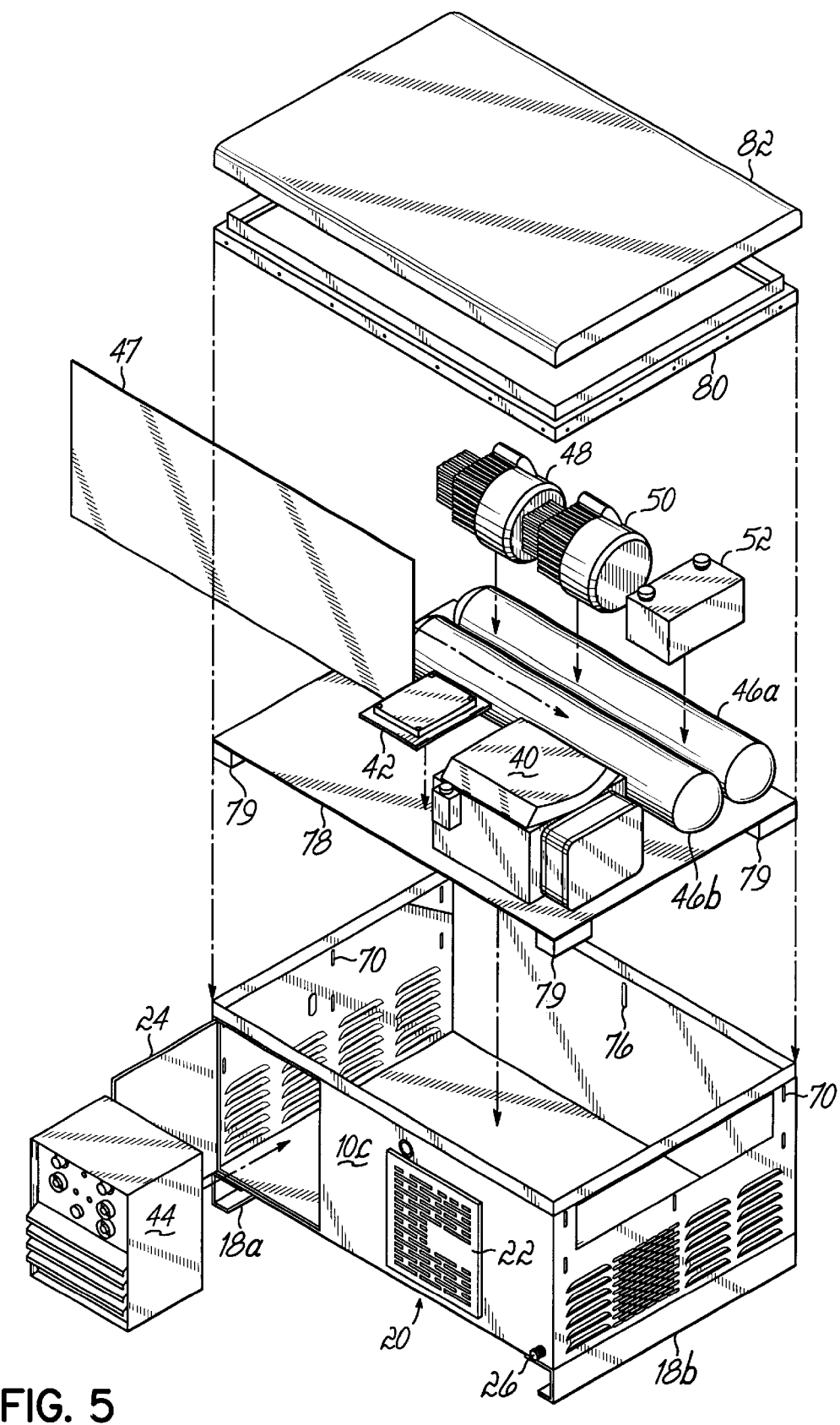

FIG. 5 illustrates a perspective view of a lower housing of the integrated power unit of FIG. 1 in which major components are shown disassembled therefrom.

DETAILED DESCRIPTION OF SPECIFIC EMBODIMENTS

Referring to FIG. 1, an integrated electrical and mechanical power generating unit in accordance with the principles of the present invention can be further described. An integrated unit 10 is shown positioned within the bed of a full size pickup truck. The integrated unit 10 comprises upper housing portions 10a and 10b which form bolsters, and a lower housing portion 10c which rests in the bed of the pickup truck.

As will be discussed in further detail below, bolsters 10a and 10b are vertically adjustable in the direction of arrow 12 so that bolsters 10a and 10b may be positioned to rest upon the side walls 14a and 14b, respectively of the pickup truck bed. In this manner, bolsters 10a and 10b rest upon the sidewalls 14a and 14b of the pickup truck bed, while the lower housing portion 10c rests upon the floor 16 of the pickup truck bed. The greatest portion of the weight of the unit rests upon the pickup truck bed, with the bed walls supporting only the weight of the respective bolsters 10a and 10b.

Lower housing portion 10c includes feet 18a and 18b which rest upon the floor 16 of the pickup truck bed, and thus hold lower housing portion 10c in a position somewhat above the floor 16 of the pickup truck bed. In this way, feet 18a and 18b create a space or gap 20 beneath lower housing portion 10c which may be used for a storage drawer or for elongated cargo such as plywood sheets.

The rear surface of lower housing portion 10c includes a door 22 carrying venting apertures therein, and providing access to an internal combustion engine (40, FIGS. 2 and 5) within power generating unit 10. The rear surface further comprises a second access door 24 providing access to a welding power generator unit (44, FIGS. 2 and 5). The lower housing portion 10c further includes a purging outlet drain 26 for emitting moisture purged 10 from pressurized gas tanks within power generating unit 10, as explained in further detail below.

It will be seen that the lower housing portion 10c of the power generating unit 10 is sized so as to fit between the wheel wells 28a and 28b on a conventional full size pickup truck bed. This permits the power generating unit 10 to be positioned at any desired location within the pickup truck bed, including a fully forward position as shown in FIG. 1, a fully rearward position, and a position between the wheel wells 28a and 28b.

Referring now to FIG. 2, details of the internal structure of power generating unit 10 can be explored. A first component within the lower housing portion 10c of the power generating unit 10 is an internal combustion engine 40, such as a two cylinder gasoline engine, providing mechanical power for the remaining elements of the power generating unit 10. Engine 40 is arranged longitudinally to produce mechanical torque on a shaft extending outward from engine 40 and into an alternator unit 42. Alternator unit 42 produces electrical power from rotation of the shaft of engine 40, which electrical power may be used by other elements of the power generating unit 10.

A first element using electrical power is a welding power supply 44 positioned, as noted above, behind door 24 to permit access thereto. Welding power supply 44 converts three-phase alternating current electrical power from alternator unit 42 into welding voltages to be used in electrical welding. Welding unit 44 may be docked into power generating unit 10 in the position shown in FIG. 2, or may be removed via door 24 to a remote location and used at that remote location for welding. In either case, conductors carry three-phase electrical power from alternator unit 42 to welding power supply 44.

Engine 40, alternator unit 42 and welding power supply 44 are contained within a first baffled compartment of lower housing portion 10c. A longitudinal baffle 47 extending the width of lower housing portion 10c separates motor 40, alternator unit 42 and welding power supply 44 from a second baffled compartment containing compressors and air tanks as discussed below. This provides that the compartments have separate air flow paths to facilitate cooling, as is elaborated below.

Within this second compartment, are air tanks 46a and 46b for storing compressed air produced by compressors 48 and 50 positioned within the compartment above air tanks 46a and 46b. Compressors 48 and 50 are electrically powered compressors driven by electrical power produced by alternator unit 42. Compressors 48 and 50 generate compressed air which is stored within tanks 46a and 46b and available as compressed air through a control panel in bolster 10b as is described in detail below. Within the same compartment as compressors 48 and 50, is a battery 52 used to drive a starter of engine 40, which is also positioned above tanks 46a and 46b.

It can be seen in FIG. 2 that a purging connection is made to air tanks 46a and 46b by a hose 54 leading to a manual push button purge valve within a control panel in bolster 10b, and a second purging hose 55 leading from this manual control valve to outlet 26. To purge excess moisture from air tanks 46a and 46b, this manual purge valve within control panel 10 is actuated, causing compressed air to force moisture through hoses 54 and 55 out outlet 26.

Bolster 10a is a tank storing fuel for internal combustion engine 40, specifically, tank 10a is a gasoline tank for storing gasoline to be used by engine 40. The capacity of the fuel tank and bolster 10a is sufficient to maintain operation of engine 40 for at least one entire day of operation at a job site. The tank in bolster 10a may be refueled through a refueling cap 56 mounted on the outside surface of bolster 10a. Fuel filler cap 56 is located on a left side of the pickup truck and thus, on a standard pickup, will be adjacent to the fuel filler cap of pickup truck itself. Thus, fuel can be readily dispensed into the fuel tank of the pickup truck as well as into the fuel tank of the power generating unit 10. It will be further noted, that the position of the fuel filler cap 56 is at an outward edge of a bolster 10a, and further that the outer edge of bolster 10a extends outward of the bed wall of a typical pickup truck. As a consequence, any fuel spillage that occurs while filling the fuel tank in bolster 10a will flow to an area outside of the pickup truck bed, thus minimizing safety hazards from spilled fuel.

As noted, the positioning and arrangement of components with lower housing portion 10c facilitates the flow of cooling air and maintenance of acceptable temperatures of operating units within lower housing portion 10c. Specifically, a duct 58 is included within lower housing portion 10c connecting the air intake for the air cooled internal combustion engine 40 to an outside wall of lower housing portion 10c which includes a venting aperture (visible in FIG. 5). A further duct is positioned on the opposite end of internal combustion engine 40 to cause air flow from internal combustion engine 40 to flow outward through the apertures in door 22 as can be seen in FIG. 1. Thus, through ducts and positioning of internal combustion engine 40, an air flow path is established along the direction of arrow 60 such that cooling air is brought from outside the power generating unit 10, passes through internal combustion engine 40, and then is exhausted outside of lower housing portion 10c as shown along arrow 60. Thus, cooling air is provided from an outside area to engine 40 maintaining engine 40 in a proper operating temperature.

Similar ducts are provided at the outlet of air cooled alternator unit 42, such that air flow created by alternator 42 passes through and out of lower housing portion 10c along a direction shown by arrow 62. Cooling air flows into lower housing portion from outside of lower housing portion 10c, passes through welding power supply unit 44 and alternator unit 42 and then is exhausted through the apertures in doorway 22 along the direction of arrow 62. Thus, cooling air is again provided from an outside source to maintain alternator 42 at a proper operating temperature.

As noted above, a baffle 47 separates the lower housing portion into two compartments. Within the second compartment containing compressors 48 and 50 and tanks 46a and 46b, an air flow direction is established along the direction of arrow 64. Specifically, air cooled compressor units 48 and 50 create air flow passing from right to left as shown in FIG. 2, such that air is drawn into the lower housing portion 10c from the right hand side, passes respectively through compressor units 50 and 48, and then is exhausted out a left hand side of lower housing portion 10c as shown by arrow 64. Thus this arrangement of compressor units within the second baffled compartment of lower housing portion 10c facilitates the flow of cooling air maintaining compressors 48 and 50 at the proper operating temperature.

Referring now to FIG. 3, the adjustability of the bolster position can be further explained, and mountings on the opposite surface of the lower housing section can be illustrated. As illustrated in FIG. 3, bolster 10b is detached from the lower housing portion 10c to show the connections there between.

Specifically, bolster 10b has on its rear surface six threaded studs 72 which are positioned to fit within six blind holes 70 on lower housing portion 10c. Washers and nuts 73 are threaded onto stud 72 after stud 72 are inserted through holes 70, to hold the bolster 10b in a desired vertical position. Holes 70 are elongated in a vertical direction thus permitting vertical adjustment in the position of a bolster. Similar connections are used with the bolster 10a to provide adjustability of the height of bolster 10a. Additional structures such as extender panels, positioned between housing section 10c and the bolster, can be used for horizontal adjustment of the position of the bolsters 10a and 10b, if such is desired to permit fitting the power generation unit to a given pickup truck.

Referring now to FIG. 4, the control panel for the power generating unit 10, found on bolster 10b, can be further explained. The control panel includes electrical connections such as four 120 volt 20 amp, ground fault interrupt (GFI) protected outlets 81. 120 volt power is provided directly from the alternator 42 within the power generating unit. An additional single phase, 230 volt, 50 amp connector 89 is also provided, as well as a three phase, 230 volt, 50 amp connector 84. By providing single and three phase connections at 230 volts from alternator unit 42 to the control panel, substantially all electrical devices that might be operated with the power generating unit can be connected to an appropriate electrical connection.

Further electrical connections are an R, S and T connector set 86, for providing three-phase electrical power used with a welding power supply. As noted above, when welding unit 44 is removed for use at a remote location, connections may be made to connectors 86 to the remote location to provide power to the welder power supply. In such a situation, remote control signals may be provided through a connector 88.

When a welding connection or another high voltage connection is made to the power generating unit, a ground terminal 90 may be used to provide adequate grounding for the unit and the tools being used therewith.

The three phases of electrical power from alternator unit 42 are protected by a triple circuit breaker 92, to provide interruption in the case of excessive current.

The control panel further includes controls for the internal combustion engine 40 within the power generating unit. Specifically, a choke control 94, engine start button 96 and rpm switch 100 are used to start the engine as is known in the art. The engine ignition is enabled by one enable switch 98, as is also known in the art. Further readouts provide information on the engine condition. For example, high engine temperature is identified by a warning lamp 102. A count of the total running hours of the internal combustion engine is provided by a meter 104. Finally, a low engine oil condition is identified by a warning lamp 106.

As noted above with reference to FIG. 2, a manual purge valve 108 is incorporated into the control panel of the power generating unit. By actuating this control valve on the control panel, an operator may purge the air storage tanks 46a and 46b without need to access those tanks within the power generating unit. These facilitates tank purging and thus insures that the tanks are purged at the appropriate schedule.

The control panel finally includes controls and readouts for pressurized air produced by the power generating unit. Three connections are provided for pressurized air from the power generating unit. Each connection is associated with its own air regulating valve 110a, 110b and 110c as shown in FIG. 4. The air pressure being provided in each of the three outlet channels, is identified by air pressure gauges 112a, 112b and 112c shown in FIG. 4, corresponding to the air channels regulated by regulating valves 110a, 110b and 110c. Pressurized air connections are made to connectors 114a, 114b and 114c to obtain pressurized air under the control of the associated regulating valve 110 as indicated by the associated air pressure gauge 112.

The control panel may also include a remote actuator for opening a latch holding down a lid 82 (see FIG. 5) on lower housing section 10c. The remote handle may be connected by a cable to the latch so that the lid for the lower housing section 10c can be opened from the control panel.

Referring to FIG. 5, the assembly of components of the power generating unit can be explained in further detail. Specifically, lower housing position 10c is assembled by initially mounting each of the power generating units, such as the internal combustion engine 40, air tanks 46a, compressors 48 and battery 52 onto a support plate 78. Support plate 78 has cushioned mounting feet 79 to provide vibration reduction when support plate 78 is mounted in lower housing portion 10c. It can be seen that baffle 47 discussed above is inserted between the power generating components on support plate 78 to divert and control the flow of air through compartments of the lower housing portion 10c once the unit is assembled.

FIG. 5 further illustrates the removable power welding unit 44, which is installed into lower housing portion 10c through door 24. As noted above, welding power supply 44 is portable and can be carried to work site or installed into lower housing portion 10c for use at the location of the power generating unit 10. The top of lower housing portion 10c is a door 82 which can be hingedly opened to access the components within the lower housing portion 10c, and which is held closed by a latch. Compressed air lifters may be interposed between lid 82 and lower housing portion 10c so that lid 82 will move to and hold in an open position when the latch is released, facilitating maintenance. A gasket and door mounting 80 is mounted atop the lower housing portion 10c, providing rigidity to the housing portion 10c, and further providing a hinge for a door 82 mounted thereon. It will be noted that door 82 has a surrounding lip that mates with an internal lip of gasket 80 to provide for water drainage around the outside area of gasket 80 and away from the interior of lower housing portion 10c. Similarly, lower housing portion 10c has on its surface a surrounding lip which fits inside the outer rim of gasket 80, again causing water to drain around the outside of lower housing portion 10c rather than into lower housing portion 10c.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, plate 78 might not be used, and in its place units inside of lower housing section 10c could be mounted directly to the floor of lower housing section 10c. Each of the vibration-generating units (e.g., the compressors, engine and alternator) could be provided with vibration insulating feet where they mount to the lower housing section 10c. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An integrated electrical and/or mechanical power generating unit, comprising
   a lower housing portion sized for placement within a pickup truck bed,
   an upper housing portion attached to said lower housing portion and sized to extend over at least one wall of said pickup truck bed,
   an internal combustion engine within said lower housing generating electrical and/or mechanical power, and
   a fuel tank within the upper housing portion.

2. The unit of claim 1 wherein said upper housing portion includes a filler orifice connected to said fuel tank and extending outwardly from said upper housing portion away from said lower housing portion.

3. The unit of claim 2 wherein said housing, beneath said filler orifice, is shaped to provide a flow path on the outside of the upper housing for spilled fuel.

4. A portable compressed air generating unit, comprising
   a housing,
   a compressor within said housing,
   an accumulator tank within said housing connected to said compressor for storing compressed air, having a purge orifice,
   a hose having a first end connected to said purge orifice, and a second end,
   a remote manual purge valve connected to a second end of said hose, and delivering purged liquid outside of said housing.

5. The unit of claim 4 further comprising an electric power generator.

6. The unit of claim 5 wherein said compressor is connected to said electric power generator for obtaining electrical power therefrom.

7. The unit of claim 5 further comprising a welding power supply connected to said electric power generator for obtaining electrical power therefrom.

8. An integrated electrical and/or mechanical power generating unit, comprising
   a lower housing portion sized for placement within a full size pickup truck bed and having a longest dimension less than the distance between wheel wells of said pickup truck bed,
   an upper housing portion attached to said lower housing portion and sized to extend over at least one wall of said pickup truck bed,
   an internal combustion engine within said lower housing generating electrical and/or mechanical power.

9. The unit of claim 8 mated with a pickup truck, positioned in a pickup truck at a forward end of a bed of said pickup truck.

10. The unit of claim 8 mated with a pickup truck, positioned between wheel wells of said pickup truck.

11. An integrated electrical and/or mechanical power generating unit, comprising
    a lower housing portion sized for placement within a pickup truck bed,
    an upper housing portion attached to said lower housing portion and sized to extend over at least one wall of said pickup truck bed, said upper housing portion being adjustably mounted to said lower housing portion, permitting a position of said upper housing portion relative to said lower housing portion to be changed either vertically or horizontally.

12. An integrated electrical and/or mechanical power generating unit, comprising
- a lower housing portion sized for placement within a pickup truck bed,
- an upper housing portion attached to said lower housing portion and sized to extend over at least one wall of said pickup truck bed,
- said lower housing portion comprising feet extending downwardly therefrom, to support said lower housing portion on a floor of said pickup truck bed and suspend a bottom side of said lower housing portion above said floor.

13. The unit of claim 12, further comprising a storage drawer positioned beneath said bottom side of said lower housing portion.

14. The unit of claim 12, wherein said feet are spaced to permit insertion of a four foot wide sheet between said feet.

15. An integrated electrical and/or mechanical power generating unit, comprising
- a housing sized for placement within the bed of a pickup truck,
- an air-cooled internal combustion engine having internal air flow passages,
- an air cooled power converting unit coupled to receive power generated by the engine and having internal air passages,
- ducting within said housing to deliver cooling air to or from the internal air flow passages of the engine from or to an area outside of the housing,
- ducting within said housing to deliver cooling air to or from the internal air flow passages of the power converting unit from or to an area outside of the housing.

16. The unit of claim 15 wherein said power converting unit is an alternator.

17. The unit of claim 15 wherein said power converting unit is a compressor.

18. The unit of claim 17 further comprising:
- an alternator having internal air flow passages, and
- ducting within said housing to deliver cooling air to or from the internal air flow passages of the alternator from or to an area outside of the housing.

19. An integrated electrical power generating unit, comprising
- a housing sized for placement within the bed of a pickup truck,
- a generator within said housing generating three-phase alternating current electrical power for use by a welding power supply,
- a welding power supply connectable to said generator,
- a closet space within said housing for removably receiving said welding power supply such that the welding power supply can be used for welding when positioned within said closet space, and when positioned remotely of said unit.

20. An integrated power unit for use with a vehicle pickup truck having a truck bed with opposed sidewalls, the integrated power unit comprising:
- a housing adapted to be placed in the truck bed between the opposed sidewalls;
- an electrical power generating unit disposed within the housing;
- an electrically powered compressor disposed in the housing and electrically connected to the electrical power generating unit;
- a first air flow path within the housing for receiving first cooling air from a first location outside the housing and directing the first cooling air past the electrical power generating unit to outside the housing; and
- a separate air flow path within the housing for receiving separate cooling air from a different location outside the housing and directing the separate cooling air past the electrically powered compressor to outside the housing.

21. The integrated power unit of claim 20 further wherein the electrical power generating unit further comprises:
- an engine disposed within the housing; and
- an alternator disposed within the housing and mechanically connected to the engine.

22. The integrated power unit of claim 20 further comprising a plurality of electrically powered compressors.

23. The integrated power unit of claim 22 wherein the second air flow path further comprises a plurality of separate air flow paths within the housing for receiving the separate cooling air from outside the housing and directing the separate cooling air via each of the plurality of separate air flow paths past a respective one of the plurality of electrically powered compressors to a location outside the housing.

* * * * *

UNITED STATES PATENT AND TRADEMARK OFFICE
CERTIFICATE OF CORRECTION

PATENT NO. : 6,670,580 B2
DATED : December 30, 2003
INVENTOR(S) : Brofft et al.

It is certified that error appears in the above-identified patent and that said Letters Patent is hereby corrected as shown below:

Column 1,
Line 20, "used to providing the" should read -- used to provide the --.

Column 2,
Line 12, "bed of pickup" should read -- bed of a pickup --.
Line 41, "Although, the unit" should read -- Although the unit --
Line 50, "tail gate" should read -- tailgate --.
Line 53, "such a plywood" should read -- such as plywood --.

Column 3,
Line 9, "called for the" should read -- called for by the --.

Column 4,
Line 6, "tail gate" should read -- tailgate --.
Line 15, "horizontally accommodate" should read -- horizontally to accommodate --.
Line 18, "In further related" should read -- In a further related --.
Line 39, "pickup track" should read -- pickup truck --.

Column 6,
Line 8, "moisture purged 10" should read -- moisture purged --.

Column 8,
Line 10, "stud 72" should read -- studs 72 --.
Line 28, "three phase" should read -- three-phase --.
Line 29, "single and three phase" should read -- single- and three-phase --.
Line 65, "These facilitates" should read -- This facilitates --.

Column 9,
Line 7, "channels, is" should read -- channels is -- .
Line 21, "housing position" should read -- housing portion --.

Column 11,
Line 30, "air cooled" should read -- air-cooled --.

UNITED STATES PATENT AND TRADEMARK OFFICE
CERTIFICATE OF CORRECTION

PATENT NO.     : 6,670,580 B2
DATED          : December 30, 2003
INVENTOR(S)    : Brofft et al.

It is certified that error appears in the above-identified patent and that said Letters Patent is hereby corrected as shown below:

Column 12,
Line 34, "further wherein" should read -- wherein --.

Signed and Sealed this

Sixth Day of July, 2004

JON W. DUDAS
*Acting Director of the United States Patent and Trademark Office*